April 29, 1952  F. R. ELLIOTT  2,594,888
CONTROL OF MULTIENGINE AIRCRAFT
Filed Feb. 4, 1949  3 Sheets-Sheet 1
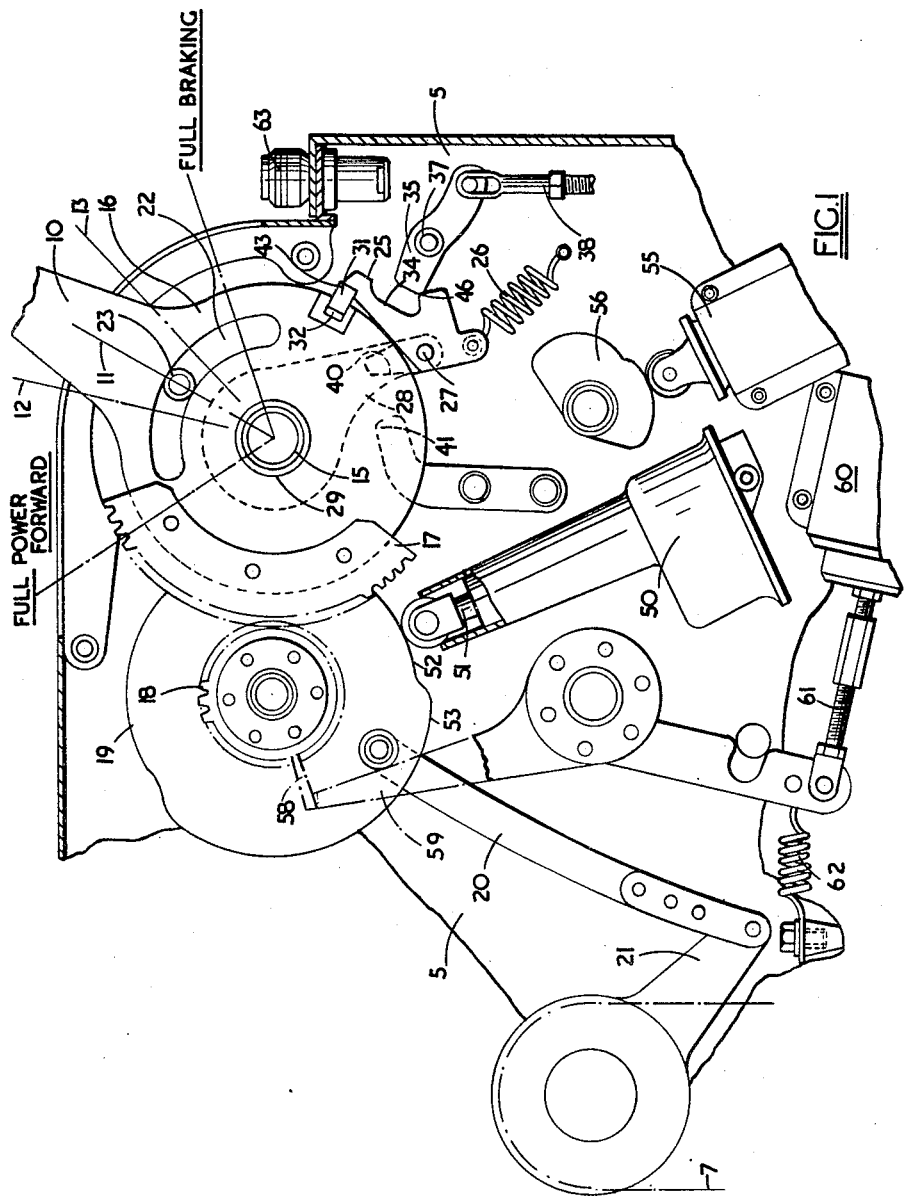
INVENTOR
FREDERICK R. ELLIOTT
by Mawhinney & Mawhinney
Attys.

April 29, 1952   F. R. ELLIOTT   2,594,888
CONTROL OF MULTIENGINE AIRCRAFT
Filed Feb. 4, 1949   3 Sheets-Sheet 2
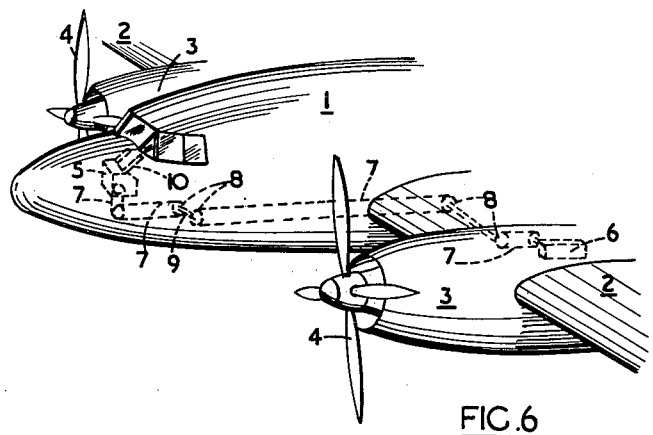
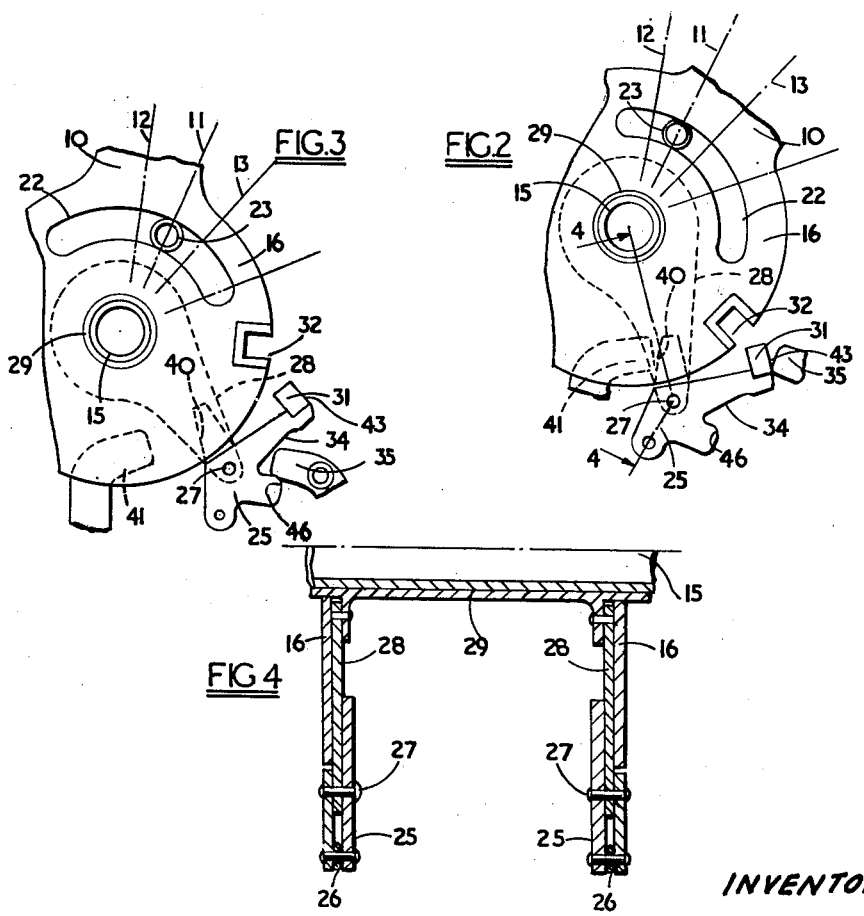
INVENTOR
FREDERICK R. ELLIOTT
by Mawhinney & Mawhinney
Attys.

Patented Apr. 29, 1952

2,594,888

UNITED STATES PATENT OFFICE 2,594,888

CONTROL OF MULTIENGINE AIRCRAFT

Frederick R. Elliott, Coventry, England, assignor to Sir W. G. Armstrong Whitworth Aircraft Limited, Coventry, England Application February 4, 1949, Serial No. 74,632
In Great Britain April 22, 1948

3 Claims. (Cl. 170—135.2)

This invention relates to an aircraft having reversible-pitch airscrews, driven from different engines, on opposite sides of the longitudinal centre line of the aircraft.

In the case of such an aircraft (with, say, only two engines), it is very important that the pilot on landing should not inadvertently put one of the airscrews into reverse pitch before the other, as in that case there would be a likelihood of the aircraft "swinging" with the possibility of loss or damage resulting. In order to prevent this from happening it is known to provide special fitments or locks which have to be independently manually released by the pilot.

The release of such locking devices takes time, however, and involves the use of another hand, which is very unsatisfactory; and the main object of the present invention is to provide an improved lock which is automatically released in the appropriate conditions.

A further object is to provide an automatic locking and releasing means which is eminently suitable for use with airscrews driven by internal-combustion turbine engines.

Obviously the principles are applicable to a four-engined aircraft, in which case one lock may operate between the port and the starboard outboard engines, and a second lock between the port and the starboard inboard engines. That is to say, it is not necessary that all four engines should be interlocked with one another as long as the opposing engines of a pair are interlocked.

According to the invention, each engine throttle lever is movable in opposite directions from a predetermined idling or closed position to accelerate the associated engine, means being provided for automatically reversing the pitch of the associated airscrew when the throttle lever is being moved through the said predetermined closed position, and an automatic interlock is provided between the throttle levers, whereby, as they are being moved from the forward pitch position towards the reverse-pitch position, neither can be moved independently of the other beyond the predetermined closed position, the throttle levers then being moved substantially equally in the accelerating direction with the airscrews in reverse pitch.

The arrangement is preferably such that the interlock is automatically removed, after a predetermined movement of the throttle levers in the accelerating direction with the airscrews in reverse pitch, to allow differential operation of the engines. Furthermore, it is preferable that the throttle levers, on their return movement (towards the forward pitch position), are again interlocked for movement in unison at the position at which the interlocks previously were removed, until they reach the said predetermined closed position at which they originally became interlocked.

In the accompanying drawings:

Figure 1 is a composite elevational view of one arrangement according to the invention, the visible throttle lever being shown in the said predetermined closed position, i. e., in the idling position in the case of an airscrew driven by a gas turbine;

Figure 2 is a corresponding fragmentary view of the parts when the visible throttle lever is in the No Power (Reverse) position, and Figure 3 the corresponding view for the No Power (Forward) position;

Figure 4 is a fragmentary section, to a larger scale, taken on the line 4—4 of Figure 2;

Figure 6 is a fragmentary perspective view of the front of an aircraft incorporating such an interlock.

Figure 5:
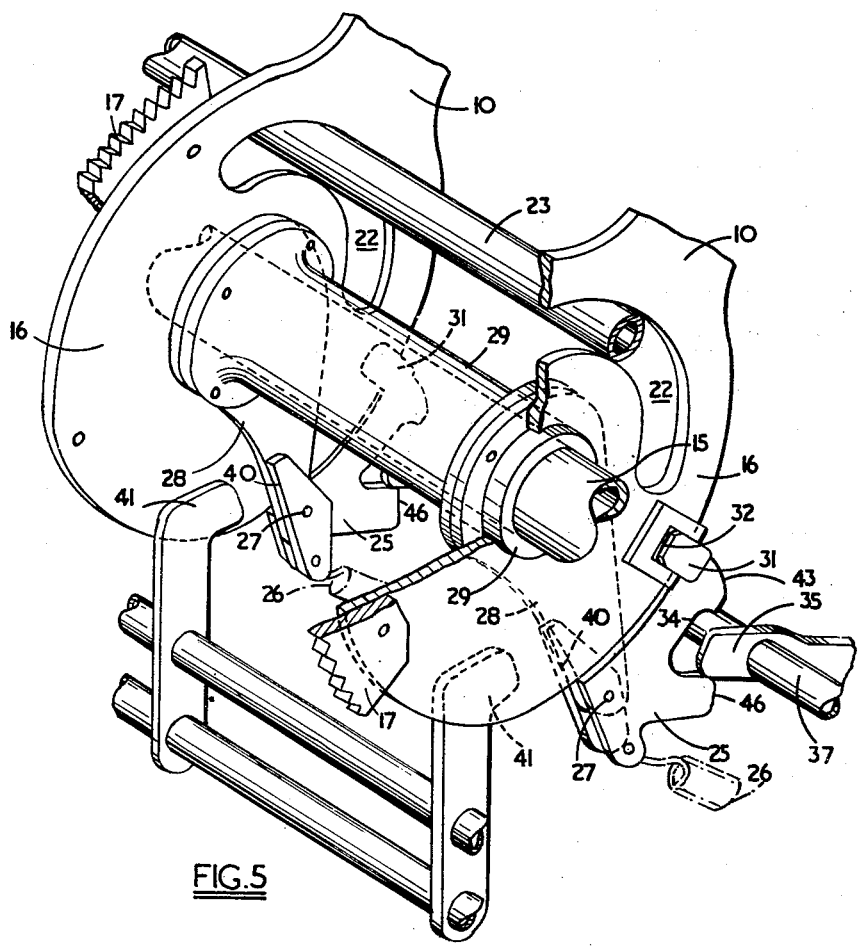
Figure 5 is a fragmentary perspective view, to a larger scale, of the interlock.

In the construction shown in the drawings, one pair of opposed engines, of an aircraft, is assumed to be interlocked in the aforesaid manner and to be operable quite independently of any other pair—for example, of a second pair in the case of a four-engined machine.

Figure 6 shows an aircraft having a body 1 and wings 2 on each side of it, each of the wings supporting an engine 3 for driving a propeller 4. In the pilot's cockpit there is indicated a throttle box 5, and the port side engine throttle 6 can be operated therefrom by means of endless transmission means 7, running round pulleys or chain wheels 8, and shafts 9, these being operable by the port side throttle lever 10 in any convenient manner.

In the case of gas turbines, by which the aircraft is assumed, in the present instance, to be powered, it is usual for each throttle lever 10 to have an idling position (which is the position referred to above as the predetermined closed position) at which the unit is making, for example, 8,000 R. P. M. In addition, each throttle lever has No Power (Forward) and (Reverse) positions, in which the unit is making, say, 11,000 R. P. M. These three positions are marked on Figures 1, 2 and 3 by the chain lines 11, 12 and 13, respectively; Figure 1 also indicating, by chain lines, the full forward power position and the braking position.

Figure 4 shows portions of the two throttle levers 10 and portions of some of the associated parts, the throttle levers being mounted for angular movement about a fixed shaft 15. Figures 1, 2 and 3 are assumed to be showing the starboard throttle lever and associated parts—i. e., the throttle lever for the starboard engine. The throttle levers and associated parts for the two engines are similar to one another.

Each throttle lever is fast with a disc 16 having a toothed segment 17 (Figure 1) engaged with a pinion 18 fast with a disc 19. The disc 19 is linked at 20 to a lever arm 21 controlling the fuel supply—i. e., serving as the engine throttle. The link 20 is at a dead-centre position with respect to the disc 19 when the throttle lever is in the said predetermined closed position, or idling position 11, as shown by Figure 1. That is to say, movement of the throttle lever from that position 11 either for forward power or for reverse power will accelerate the associated gas turbine.

Each throttle lever disc 16 is, in the present instance, provided with an arcuate slot 22 coacting with a fixed limit stop 23.

Associated with each disc 16 is a trigger 25 biased by a spring 26 (Figure 1), and the two triggers are pivotally mounted at 27 on arms 28, 28, respectively, which are fast on a common shaft 29 (Figure 4). Each trigger has a pawl 31 which rides on the surface of the associated disc 16, being biased by the spring 26 thereagainst, and the disc has a recess 32 which the pawl can enter, as shown by Figure 1, when the throttle lever is moved to the predetermined closed position 11 from a forward pitch position. When the trigger moves in this manner, under the applied spring bias, an abutment surface 34 of it (see Figure 3) clears a stop 35 which would prevent the further movement in the same direction of the throttle lever. However, such further movement is prevented by the corresponding abutment surface of the trigger associated with the other throttle lever engaging its stop. That is to say, when both throttle levers are in, say, position 12, the no forward power position, if the starboard throttle lever be moved clockwise (in the reverse pitch direction) more quickly than the port lever, so that the starboard lever, as shown by Figure 1, accepts the associated pawl 31 before the pawl of the port trigger 25 has been accepted, then the engagement of the abutment surface 34, of the port trigger 25, with the stop 35, prevents further clockwise motion of the starboard throttle lever 1. When, however, the port throttle lever reaches the position 11, shown in Figure 1 for the starboard throttle lever, i. e., the said idling position, both triggers have moved to carry their abutment surfaces 34 clear of the stop 35, and further movement in the same direction applied to either of the throttle levers will cause them both to move in unison, with the arms 28 (carrying the triggers) also rotating in unison.

In the present instance, for setting purposes, the stop 35 is shown as being pivotally mounted at 37 and adapted to be positioned within limits by means of an adjustable anchoring bar 38.

When the two throttle levers have been moved in this clockwise direction to the no power reverse position, i. e., position 13, as shown by Figure 2, an abutment surface 40 of each trigger engages a stop 41 by means of which the trigger is moved clockwise on its associated arm 28, causing the withdrawal of the pawl 31 from the recess 32. In consequence, both throttle discs 16 are released, and the two throttle levers can then be moved further in the same clockwise direction differentially.

In this latter position of the trigger, however, a further abutment surface 43 (Figure 2) is now positioned against the stop 35 to prevent the return movement of either throttle lever until both have been moved back to the no power reverse position 13. That is to say, if the starboard throttle lever is moved back to this position before the port throttle lever, the trigger 25 for the starboard lever will turn counter-clockwise on its arm and the pawl 31 can re-enter the recess 32, thus clearing the stop 35. Further movement in that direction (the forward pitch direction) of the starboard throttle lever is, however, prevented by the engagement of the abutment surface 43 of the port trigger 25 with its stop 35. But, when both throttle levers have reached the no power reverse position 13, then they can be moved further in the same anti-clockwise direction, and during such further movement they are again "ganged" by the arm-carrying shaft 29.

In a rather similar manner, by reference to Figures 1 and 2, it will be observed that as the throttle levers again reach position 11, the idling position, the abutment surfaces 46 on the triggers engage the stops 35 and effect clockwise rotation of the triggers, thus releasing the pawls 31 from the recesses 32 in the throttle discs, thereby enabling the throttle levers to be moved differentially in the forward pitch direction.

The manner in which the pitch of the airscrews is reversed may take any of the well-known forms, and, in the present instance, the reversing of the pitch is controlled by a switch or other control 50 having a plunger 51 co-operating with the surface of the disc 19. The latter has a low contour portion 52 which is shown in Figure 1 as engaged with the plunger 51, and rotation of the throttle lever 10 from the idling position 11 to position 13, which effects counter-clockwise rotation of the disc 19, brings a high contour portion 53 of the disc surface into engagement with the plunger and thus operates the control 50 to bring about the reversal of the pitch of the airscrew blades, and causes the red light 63 to glow indicating that the reversing switches have operated. Conversely, movement of the throttle lever in the anti-clockwise direction removes the high contour portion 53 of the disc 19 from engagement with the plunger of the control 50, whereupon the pitch-actuating mechanism again sets the pitch for forward operation in a manner known per se.

The drawing also shows a warning device 55, adapted to give a visible or an audible warning as required, which is operable by a cam 56. This cam is connected in any convenient manner to be movable in unison with the landing flap lever, such that if the flaps are set to "land" with the undercarriage retracted, the visual or audible warning devices will be operated.

It is very important that the airscrew blades should not be moved into reverse pitch until the aircraft has landed. To ensure this the drawing shows a stop 58 fast on the disc 19 and co-acting with the end of a catch 59, whereby the movement of the throttle lever from position 11 in a clockwise direction is prevented. When the aircraft is landed, however, any suitable means responsive to the landing pressure on the landing gear is applied, in a manner known per se, to an electric or hydraulic servo device indicated at 60, causing the latter to pull on the link 61 and thus rotate the catch 59 anti-clockwise against the bias of the applying spring 62, whereby to clear the catch from the stop 52.

What I claim as my invention and desire to secure by Letters Patent of the United States is:

1. For an aircraft having reversible-pitch airscrews, driven from different engines, on opposite sides of the longitudinal centre line of the aircraft, coaxially-mounted throttle levers for the engines, means whereby each throttle lever will accelerate the associated engine when moved in either direction from a predetermined closed position, a trigger associated with each throttle lever and adapted in said predetermined closed position of the latter to interlock therewith, a stop for each of said triggers, each of said triggers arranged when moving to the interlocking position to move clear of its associated stop, said triggers mounted on arms which are connected to one another for rotation in unison about the axis of said throttle levers whereby the throttle lever which first reaches said predetermined position is held there by the engagement of the other trigger with its stop until the other lever reaches the said predetermined position, in which latter conditions both throttle levers can be moved in unison in the same direction, and means for reversing the pitch of the airscrew when the associated throttle lever is moved in the aforesaid direction from said predetermined position.

2. The combination of claim 1, and including also stops positioned to engage said triggers after said throttle levers have been moved to a predetermined extent in unison and to cause said triggers to release the associated levers, whereby said levers can then be moved differentially still further in the same direction.

3. The combination of claim 2, and including also return stops coacting with the triggers when released from the levers, such that when either throttle lever is returned to the position at which its trigger was released, it will again be engaged by the associated trigger thereby to release the trigger from its return stop, being held against further return movement until the other throttle lever reaches such a position and is engaged by its trigger.

FREDERICK R. ELLIOTT.

REFERENCES CITED

The following references are of record in the file of this patent:

UNITED STATES PATENTS

| Number | Name | Date |
|---|---|---|
| 1,889,295 | Rosatelli | Nov. 29, 1932 |
| 2,430,363 | Parkes | Nov. 4, 1947 |
| 2,446,700 | Giles | Aug. 10, 1948 |